Figure 1:
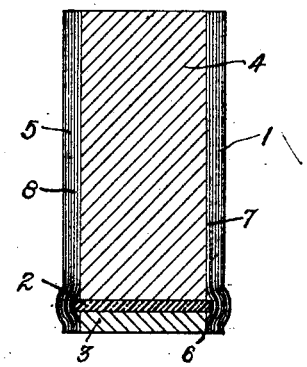

W. H. KEMPTON.
METHOD OF CONSTRUCTING CONTAINERS.
APPLICATION FILED AUG. 10, 1918.

1,332,045.

Patented Feb. 24, 1920.

WITNESSES:
Ed. V. Hinton
O. E. Bee.

INVENTOR
Willard H. Kempton
BY
Wesley G. Carr
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF CONSTRUCTING CONTAINERS.

1,332,045.  Specification of Letters Patent.  Patented Feb. 24, 1920.

Application filed August 10, 1918. Serial No. 249,347.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Methods of Constructing Containers, of which the following is a specification.

My invention relates to containers and more particularly to dash-pot casings, and it has for its primary object the construction of a dash-pot casing, comprising superimposed layers of impregnated sheet material, by molding a cured bottom into an uncured tube composed of the same material as the bottom.

One object of my invention is to construct a container which shall be mechanically strong and which will be unaffected by wide temperature changes, moisture, oils, weak acids and alkalis.

Another object of my invention is to construct containers by a method which will permit accurate predetermination of the dimensions desired.

A further object of my invention is to construct a container in which a smooth hard surface may be obtained without further work than that required in the natural course of constructing the container.

A still further object of my invention is to construct a container or dash-pot casing whose surfaces shall have desirable self-lubricating qualities.

A still further object of my invention is the manufacture of dash-pot casings by separately preforming cured and uncured portions constituting the body and then molding the portions together in such manner that a strong, air-tight joint may be obtained.

With these and other objects in view, my invention will be more fully described, illustrated in the drawings, in the several views of which corresponding numerals indicate like parts, and then particularly pointed out in the appended claims.

Figure 2:
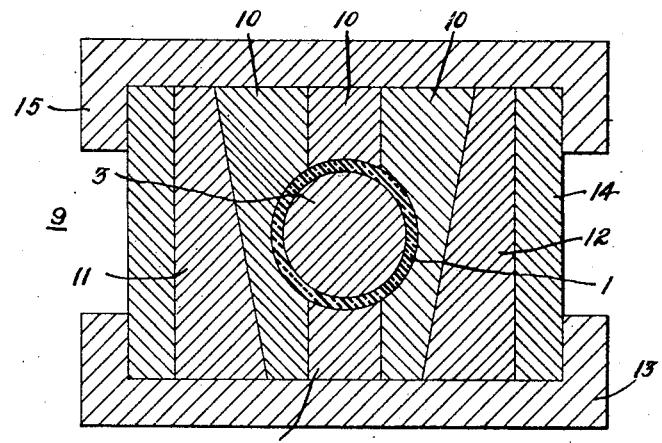
Figure 3:
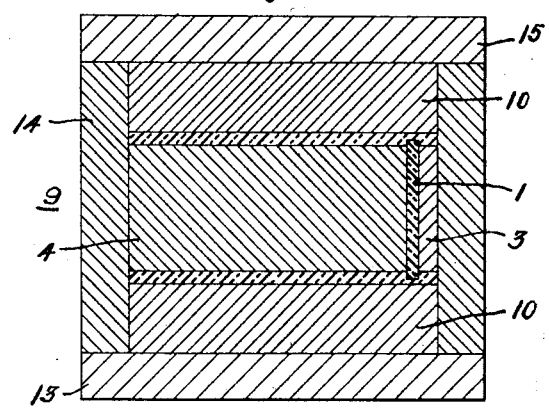

Referring to the drawings, Figure 1 is a diametrical, sectional view of a dash-pot casing embodying my invention, showing mandrels employed in constructing the casing; Fig. 2 is a vertical, transverse sectional view of a mold which may be employed in treating containers constructed in accordance with my invention, a container being shown, in section, inclosed in the mold, and Fig. 3 is a central longitudinal, sectional view of the mold and container shown in Fig. 2.

In practising my invention, I may construct a container or dash-pot casing by first preforming and curing a disk which may be subsequently utilized as a bottom for the container. The disk may be placed between two mandrels of less diameter than the disk and impregnated sheet material may be wound about the disk and the mandrels to form a tube inclosing them. The body thus assembled may then be placed in a suitable mold and subjected to heat and pressure to compact the material forming the tube and harden the binder with which it is impregnated.

In Fig. 1 is shown, diagrammatically, a dash-pot casing 1 formed preparatory to molding. The material employed may be a fibrous sheet material such as duck, paper, or loosely matted fibrous material, such as cotton batting, the material employed being governed by the nature of the finished product desired. For instance, if paper is employed, a product having relatively great tensile strength may be obtained, whereas, if duck is employed a product having less tensile strength but greater resiliency will be obtained. The binder employed may be a phenolic condensation product, such as bakelite. The preformed and cured disk 2 is made of impregnated sheet material by stacking the impregnated sheet material and subjecting it to heat and pressure after which the disk 2 may be cut from the stacked and compressed material or the impregnated sheet material may be cut to shape before it is stacked and pressed. In either event, heat and pressure, sufficient to first soften and compact the material and to then permanently harden the binder, should be employed.

The disk 2, after being cured, may be disposed between two mandrels 3 and 4, of less diameter than the disk 2. so that the disk projects beyond the mandrels. The mandrels 3 and 4 will also be of different lengths so that a tube 5, which is formed about them, may have chambers 6 and 7, of different lengths, on the respective sides of the disk 2. A material 8, similar to that employed in constructing the disk, may be impregnated with a suitable binder, such as a phenolic condensation product, and wound about the mandrels 3 and 4 and the disk 2 between them until a suitable thickness has been reached. The body thus formed is then in condition for the application of heat and pressure to compact the material forming the tube 5 and to harden the binder with which it is impregnated.

Furthermore, the self-lubricating qualities of the finished container may be greatly increased by the distribution of a small percentage of lubricant, such as graphite, over the inner surface of the wall of the tube 5. This may be accomplished by mixing the graphite with the binder employed in impregnating one end of the sheet material 8 or the graphite may be rubbed or dusted on the material 8 after it is impregnated and previous to winding it about the mandrels 3 and 4.

The material that bulges over the disk 2, when it is wound about the mandrels 3 and 4 and the disk 2 is compressed, when subjected to heat and pressure in a mold, and engages the disk in such manner that a mechanically strong and air-tight joint is obtained. This is partially due to the nature of the binder which, when heated, tends to flow into any openings which have been formed in constructing the body and partially to the compressibility of the sheet material.

The mold 9 shown in Fig. 2 is of standard construction and is shown only to illustrate the method of constructing my improved casing. The container 1 may be preformed, as shown in Fig. 1, and the splits 10 of the mold 9 assembled about it. The splits 10 and the casing 1 may then be placed between the wedges 11 and 12 which are supported by the bottom clamping plate 13; the wall 14 of the mold 1, which also rests upon the bottom clamping plate 13, incloses the entire structure. The top clamping plate 15 may then be placed on the splits 10 and pressure applied to force the casing 1 and the splits 10 surrounding it down into the mold 9. Pressure is thus brought to bear upon all sides of the casing 1 through the action of the splits 10 in conjunction with the wedges 11 and 12. Heat may be applied during the operation to soften the binder and then to harden it.

Casings formed in the manner disclosed are very strong mechanically because of their laminated structure and the character of the binder employed. Furthermore, if care is taken to insure a coating of binder on the exterior of the material after it is molded, self-lubricating qualities, which under ordinary conditions, will be sufficient, may be obtained without the addition of graphite or similar lubricant. A container constructed in accordance with my invention is, to the best of my knowledge, cheaper than any equivalent containers now in use. The material employed in forming containers in accordance with my invention may be easily handled, as the sheet material may be impregnated with the binder and then dried, the binder subsequently becoming active upon the application of further heat and pressure.

It will be apparent that a container may be constructed, in the manner disclosed herein, by utilizing different material in forming the bottom than that employed in forming the tube and the same result obtained if both materials have substantially the same coefficient of expansion.

Although I have described and illustrated only one form of container, it is obvious that minor changes may be made in constructing containers without departing from the spirit of my invention and I desire, therefore, that no limitations shall be imposed except such as are indicated in the appended claims.

I claim as my invention:

1. A method of constructing containers that comprises molding a disk of impregnated fibrous material, disposing mandrels on opposite sides of the disk, the mandrels being of less diameter than the disk, winding impregnated sheet material about the mandrels and disk and subjecting the assembled structure to heat and pressure in a mold.

2. A method of constructing containers that comprises forming a disk of fibrous sheet material impregnated with a phenolic condensation product, disposing mandrels on opposite sides of the disk, the mandrels being of less diameter than the disk, winding fibrous sheet material impregnated with a phenolic condensation product about the mandrels and disk and subjecting the assembled structure to heat and pressure in a mold.

3. A method of constructing containers that comprises molding a disk of impregnated sheet material within a tubular body of similar material.

4. A method of constructing containers that comprises molding a disk of sheet material impregnated with a phenolic condensation product within a tubular body of similar material.

5. A method of constructing containers that comprises molding a disk of sheet material impregnated with a phenolic condensation product within a tubular body of similar material and embedding the disk in the wall of the tubular body.

6. A method of constructing containers that comprises molding a disk of sheet material impregnated with a phenolic condensation product and molding a tubular body of like material about it under such pressure as to form the edge of the disk into the wall of the body.

7. A method of constructing containers that comprises molding a bottom into a tubular body comprising superimposed layers of fibrous material impregnated with a binder adapted to harden under the application of heat and pressure.

8. A method of constructing containers that comprises molding a bottom into a body comprising superimposed layers of sheet material impregnated with a binder adapted to harden under the application of heat and pressure.

9. A method of constructing containers that comprises molding a preformed bottom into a tubular body comprising superimposed layers of sheet material impregnated with a phenolic condensation product.

In testimony whereof, I have hereunto subscribed my name this 7th day of August 1918.

WILLARD H. KEMPTON.